(12) United States Patent
Chen

(10) Patent No.: US 11,269,147 B2
(45) Date of Patent: Mar. 8, 2022

(54) CABLE ASSEMBLY HAVING A CONNECTOR AND AN UN-PLUGABLE CABLE HAVING A FIBER CONNECTOR FOR CONNECTING WITH THE CONNECTOR

(71) Applicant: BKS TEC CORP., Hsinchu County (TW)

(72) Inventor: Cheng-Sean Chen, Hsinchu County (TW)

(73) Assignee: BKS TEC CORP., Hsinchu (TW)

( * ) Notice: Subject to any disclaimer, the term of this patent is extended or adjusted under 35 U.S.C. 154(b) by 0 days.

(21) Appl. No.: 16/752,623

(22) Filed: Jan. 25, 2020

(65) Prior Publication Data
US 2020/0241221 A1 Jul. 30, 2020

Related U.S. Application Data

(60) Provisional application No. 62/797,954, filed on Jan. 29, 2019.

(51) Int. Cl.
*G02B 6/42* (2006.01)
*H01B 11/22* (2006.01)

(52) U.S. Cl.
CPC ............ *G02B 6/428* (2013.01); *H01B 11/22* (2013.01)

(58) Field of Classification Search
None
See application file for complete search history.

(56) References Cited

U.S. PATENT DOCUMENTS

2017/0126318 A1* 5/2017 Chang ................. G02B 6/4292
2017/0363821 A1* 12/2017 Giziewicz ........... G02B 6/4244

\* cited by examiner

*Primary Examiner* — Chad H Smith
(74) *Attorney, Agent, or Firm* — Min-Lee Teng; Litron Patent & Trademark Office

(57) ABSTRACT

A cable assembly having a connector and a cable having a fiber connector, wherein the connector contains a circuit for converting electrical signals to optical signals for transmitting video or high data rate data, and the connector has an interface to connect with the fiber connector of the cable, so that the cable and the connector can be separated for making each of the connector and the cable as a standalone component.

16 Claims, 15 Drawing Sheets

CABLE ASSEMBLY HAVING A CONNECTOR AND AN UN-PLUGABLE CABLE HAVING A FIBER CONNECTOR FOR CONNECTING WITH THE CONNECTOR

CROSS-REFERENCES TO RELATED APPLICATIONS

This application claims the benefit of U.S. Provisional Patent Application No. 62/797,954 filed on Jan. 29, 2019, which is hereby incorporated by reference herein and made a part of the specification.

BACKGROUND OF THE INVENTION

I. Field of the Invention

The present invention relates to a cable, and in particular, to a cable assembly having a connector that contains a circuit for converting electrical signals to optical signals.

II. Description of the Prior Art

In recent years, optical fiber has been widely used for transmitting video signals or other high data rate signals. However, it is difficult to trace a fiber cable when many fiber cables are used to connect remote devices to local devices in the same room.

Furthermore, conventional HDMI cable uses copper wire to transfer data, which has limited bandwidth and is susceptible to noise or interference.

Accordingly, the present invention proposes a better way to design a cable to overcome the above-mentioned problems.

SUMMARY OF THE INVENTION

One objective of the present invention is to provide a cable assembly having a connector and a cable having a fiber connector at an end of the cable, wherein the connector contains a circuit for converting electrical signals to optical signals for transmitting video or high data rate data, and the connector has an interface to connect with the fiber connector of the cable, so that the cable and the connector can be separated for making each of the connector and the cable as a standalone component.

One embodiment of the present invention is to provide a cable assembly, wherein the cable assembly comprises a cable comprising at least one first fiber wire and a first un-pluggable fiber connector connected to the at least one first fiber wire; and a first connector, comprising: a first interface, for connecting with an external device; a second interface, for connecting with said first un-pluggable fiber connector; and at least one circuit board, wherein a plurality of devices are disposed on the at least one circuit board to form a circuitry, wherein the circuitry comprises at least one laser diode for emitting at least one optical signal to the at least one first fiber wire via the first connector and said first un-pluggable fiber connector.

In one embodiment, the cable further comprises at least one second fiber wire, wherein the circuitry further comprises at least one first light-emitting diode (LED) for emitting a first visible light to the at least one second fiber wire.

In one embodiment, the cable comprises the first un-pluggable fiber connector and a second un-pluggable fiber connector, wherein the first un-pluggable fiber connector and the second un-pluggable fiber connector are connected through the at least one first fiber wire, wherein the cable assembly further comprises a second connector having a third interface for connecting to the second un-pluggable fiber connector of the cable.

In one embodiment, the second connector comprising at least one second light-emitting diode (LED) for emitting a second visible light to the at least one second fiber wire.

In one embodiment, the cable comprises at least one metal wires and conforms to a standard HDMI connector.

In one embodiment, the at least one circuit board is a printed circuit board (PCB).

In one embodiment, the circuitry comprises a control IC for controlling the at least one laser diode and the at least one first LED.

In one embodiment, each LED is an RGB LED.

In one embodiment, the circuitry comprises a first switch, wherein each RGB LED emits a visible light when the first switch is on.

In one embodiment, each LED emits a visible light when the at least one laser diode is emitting the at least one optical signal.

In one embodiment, the circuitry comprises a first switch, wherein each RGB LED emits a visible light when the first switch is on.

In one embodiment, the cable assembly comprising a second connector is connected to the cable, wherein the second connector comprises: at least one second light-emitting diode (LED) for emitting a second visible light to the at least one second fiber wire.

In one embodiment, the second connector comprises a second switch, wherein each of the at least one second LED emits a visible light when the second switch is turned on.

In one embodiment, each of the at least one second LED is an RGB LED.

In one embodiment, each RGB LED emits a visible light when the second switch is on.

In one embodiment, the cable assembly further comprises a second connector, wherein the second connector and the first connector are connected by the cable, wherein the second connector is connected to an earphone.

In one embodiment, the cable assembly further comprises a second connector, wherein the second connector and the first connector are connected by the cable, wherein the second connector is integrated with an earphone.

In one embodiment, the external device is a mobile phone.

The detailed technology and above preferred embodiments implemented for the present invention are described in the following paragraphs accompanying the appended drawings for people skilled in the art to well appreciate the features of the claimed invention.

BRIEF DESCRIPTION OF THE DRAWINGS

The foregoing aspects and many of the accompanying advantages of this invention will become more readily appreciated as the same becomes better understood by reference to the following detailed description when taken in conjunction with the accompanying drawings, wherein.

DETAILED DESCRIPTION OF THE INVENTION

The detailed explanation of the present invention is described as follows. The described preferred embodiments are presented for purposes of illustrations and descriptions, and they are not intended to limit the scope of the present invention.

This embodiment discloses a cable assembly, which can be used for transmitting video or other suitable signals; in addition, the cable assembly can emit a visible light when certain conditions are met so that a user can use the visible light for different purposes.

In this embodiment, the cable assembly conforms to the HDMI standard so that the cable assembly can be applied to any HDMI compliant device. Instead of using a copper material for making the HDMI cables, active fiber optical cable is used to make the HDMI cable. In order for the user to easily identify the optical cable, the entire HDMI cable is able to light up when there is signal transmitting through the HDMI cable. Users can also choose to turn the light off completely or have it constantly lighted regardless of whether or not the signal is being transmitted. The color of the light can be changed by users; by switching colors for different cables, users can easily differentiate between different cables and their connected devices.

By using light as a transmission medium, signals can go faster and further, which provides much more bandwidth without interference. An HDMI cable made of optical fiber will also carry more video bandwidth with better quality compared to one made of copper cable.

Figure 1A:
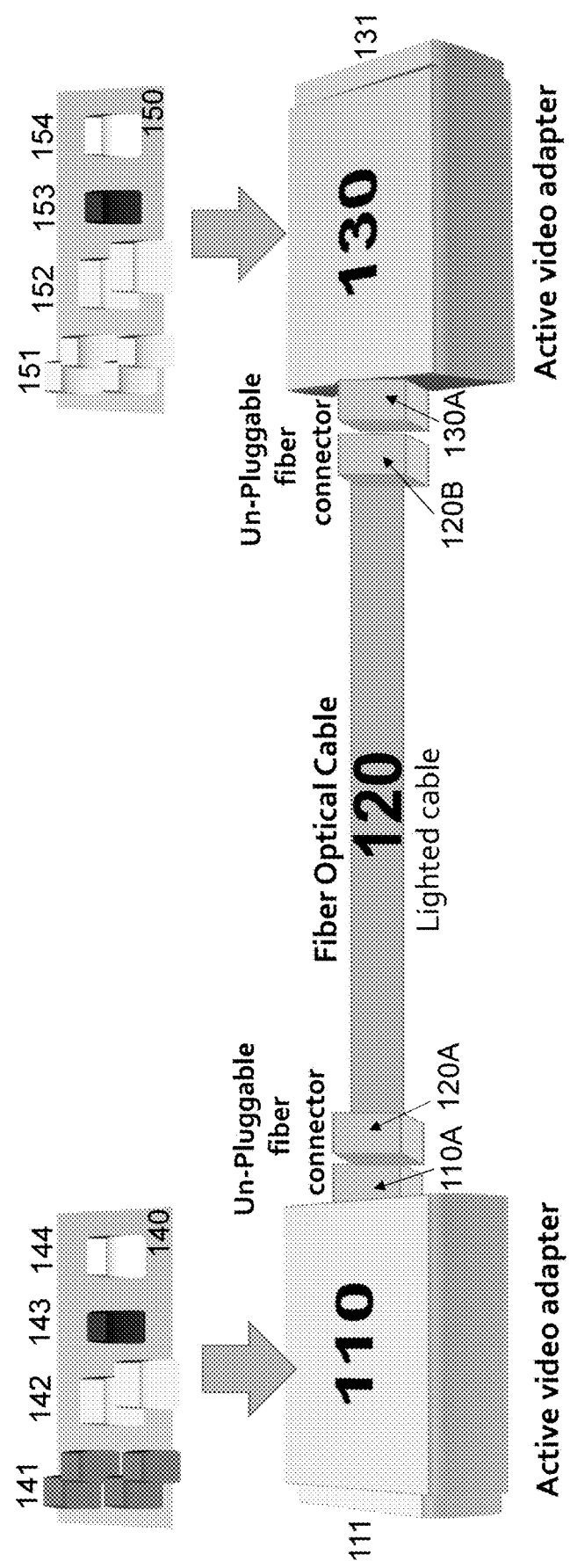
FIG. 1A illustrates a perspective view of a cable assembly according to one embodiment of the present invention.

Please refer to FIG. 1A, which illustrates a perspective view of a cable assembly according to one embodiment of the present invention. As shown in FIG. 1A, the cable assembly 100 includes a first connector 110, a second connector 130, and a cable 120 connecting the first connector 110 and the second connector 130, wherein the cable 120 includes at least one first fiber wire and a first un-pluggable fiber connector 120A connected to the at least one first fiber wire. The first connector 110 comprises a first interface 111, a second interface 110A and a circuit board such as a printed circuit board (PCB) 140. The interface 111 is used for connecting with an external device, such as a set top box, that can send video signals to the first connector 110 via the interface 111 having an electrical interface. The interface 110A having a fiber interface for connecting with the first un-pluggable fiber connector 120A. The printed circuit board (PCB) 140 carries laser diodes 141, control IC(s) 142, a first switch 143 and an LED such as a RGB LED 144 to form a circuitry for converting electrical signals received from the interface 111 to optical signals for transmitting to the optical fiber wires inside the cable 120 as well as for generating a visible light by using the switch 143 and the RGB LED 144 when certain conditions are met.

Figure 1B:
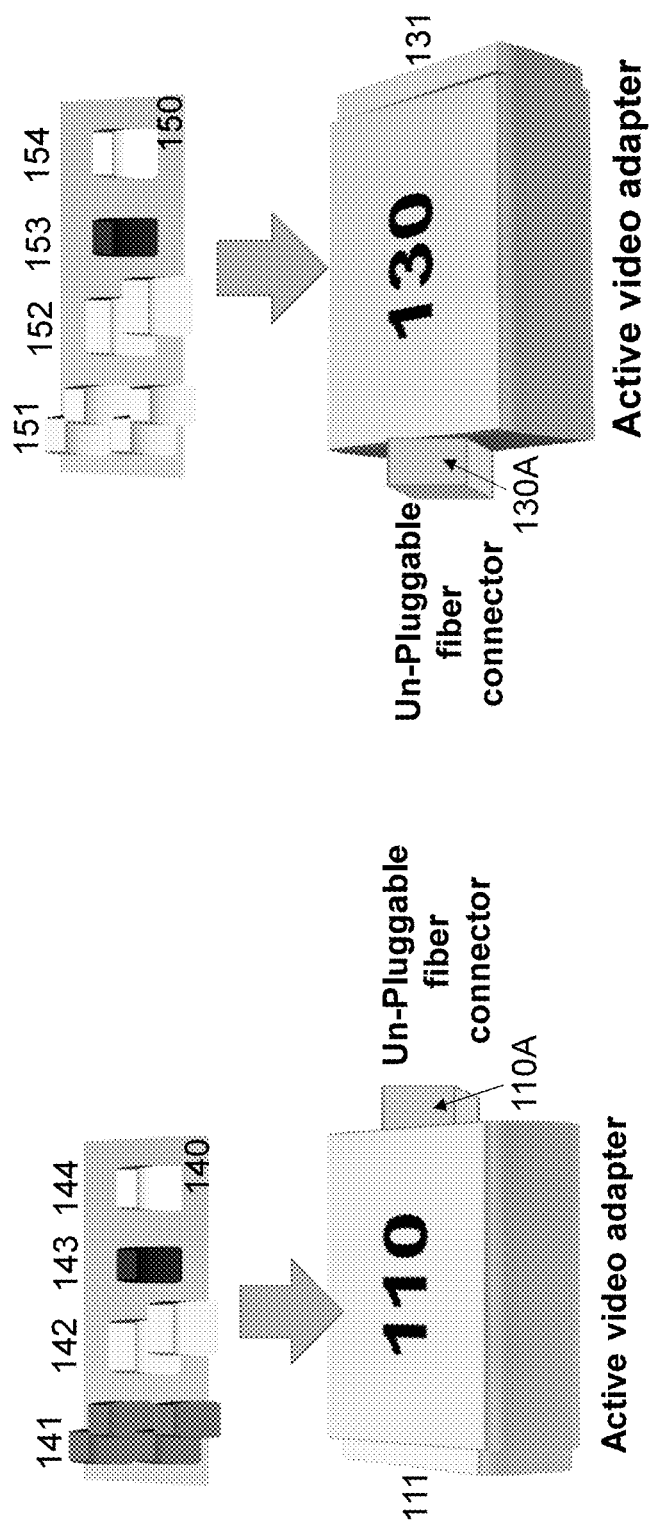
FIG. 1B illustrates a perspective view of each connector of the cable assembly according to one embodiment of the present invention.
Figure 1C:
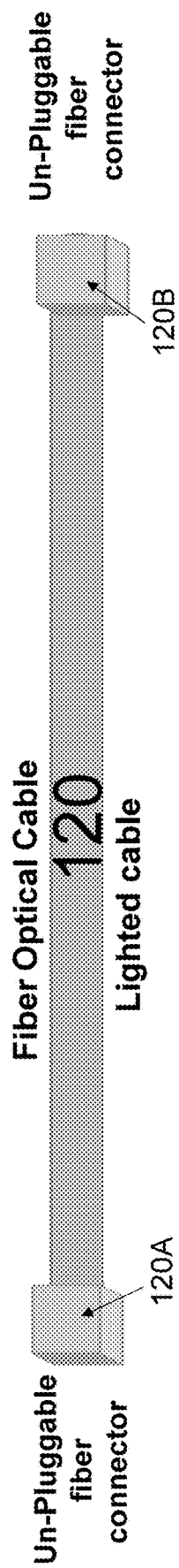
FIG. 1C illustrates a perspective view of the cable of the cable assembly according to one embodiment of the present invention.

FIG. 1B shows each of the first connector 110 and the second connector 130 with the cable 120 unplugged from the first connector 110 and the second connector 130; and FIG. 1C shows the standalone cable 120.

In one embodiment, the cable 120 further includes a second un-pluggable fiber connector 120B, wherein the first pluggable connector 120A and the second pluggable connector 120B are connected through the at least one first fiber wire of the cable 120. That is, the cable 120 has an un-pluggable connector 120A, 120B on each end of the cable 120 for matching with the fiber interface 110A of the first connector 110 and the fiber interface 130A of the second connector 130. Once the cable 120 connects the first connector 110 and the second connector 130, the video signal transmits from the Source to the Display. If the cable 120 is unplugged from either the first connector 110 or the second connector 130, the video stops transmitting. The cable 120 can be plug-in with or without power on. When the cable 120 connects the first connector 110 and the second connector 130, the LED at the first connector 110 and the second connector 130 can produce visible light to the at least one first fiber wire of the cable 120.

The circuitry on the PCB 140 comprises an electrical-to-optical converting circuit, which can be implemented by using the control IC(s) 142 and the laser diodes 141, for converting a first set of electrical signals from said first interface 111 to a first set of optical signals for transmitting to the at least one first fiber wire. The circuitry on the PCB 140 also comprises a first visible-light emitting circuit, which can be implemented by using the control IC(s) 142, the switch 143 and the RGB LED 144, for emitting a first visible light for transmitting to the at least one second fiber wire. Each of the at least one first fiber wire can be an optical fiber wire, and each of the at least one second fiber wire can be a plastic fiber wire. Please note that control IC(s) 142 can be used to control the laser diodes 141, as well as the RGB LED 144. The present invention is not limited to the implementation of the electrical-to-optical converting circuit or the visible-light emitting circuit. In addition, the present invention is not limited to how many circuit boards, or PCB(s), are used for implementing the circuitry of the first connector of the cable assembly.

In one embodiment, the RGB LED 144 emits visible light when the switch 143 is on, wherein the RGB LED 144 can emit visible light in different colors. In addition, users can use the switch 143 or with more switches to choose different light modes, which contain different colors, brightness, and lighting patterns. The RGB LED 144 can be controlled such that the RGB LED light is constantly on (with or without signal transmission), or simply turned off. The cable 120 can be constructed as a duo channel cable, which transmits both laser signals and LED light signals from one end to another. In one embodiment, the first connector 110 conforms to an HDMI standard connector.

As shown in FIG. 1A, the second connector 130 comprises: a third interface 131 for connecting with a second external device, such as a TV; an optical-to-electrical converting circuit on a PCB 150, wherein optical-to-electrical converting circuit comprises a photodiode array 151 and control IC(s) 152 for converting the optical signals back to the electrical signals for transferring data to the second external device, such as a TV; and an LED, such as an RGB LED 154, for emitting a first visible light.

In one embodiment, the second connector 130 comprises a second switch 153, wherein the RGB LED 154 emits visible light when the second switch 153 is on. Please note that control IC(s) 152 can be used to control the photodiode array 151, as well as the RGB LED 154. The RGB LED 154 can emit visible light in different colors.

FIG. 2A-2D show many different configurations or shapes of the cable. A cable includes at least one optical fiber wire and at least one plastic fiber wire and at least one metal wire, such as a copper wire. The at least one optical fiber wire is used for transmitting optical signals, the at least one plastic fiber is used for transmitting visible lights, and the at least one metal wire, such as copper wire, is used for transfer electrical signals, such as electrical control signals. The present invention is not limited to the number of the fiber wires for transmitting data from the external device or the number of the fiber wires for transmitting the visible lights, or the number of the metal wires for transmitting electrical signals.

Figure 2A:
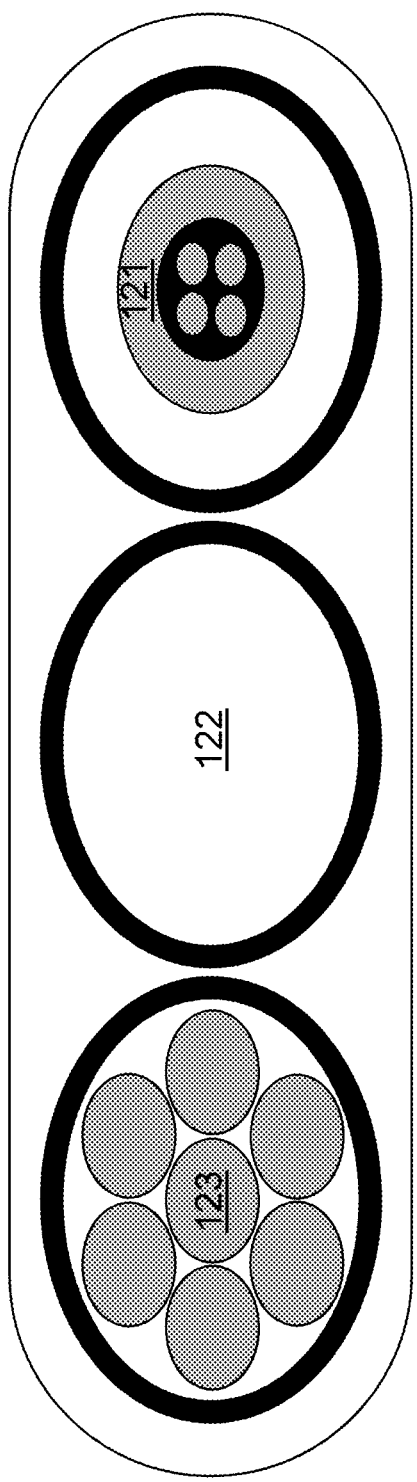
FIG. 2A-2G illustrate many different configurations or shapes of the cable according to one embodiment of the present invention.

As shown in FIG. 2A, the cable 120 includes four optical fiber wires 121 and one plastic fiber wire 122, and seven metal wires 123, wherein each of the four optical fiber wires 121 is used for transmitting an optical signal, the plastic fiber wire 122 is used for transmitting a visible light, and each of the seven metal wires 123 is used for transmitting an electrical signal.

Figure 2B:
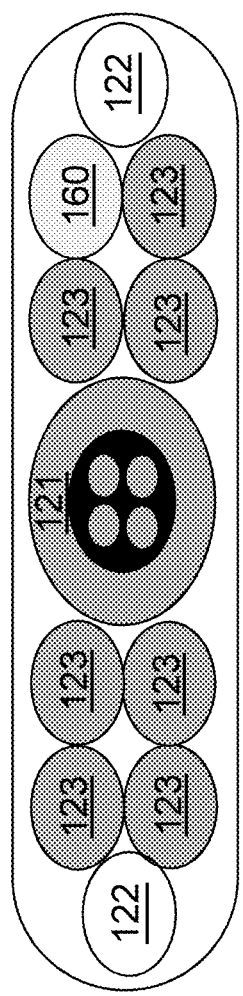

FIG. 2B shows a different configuration, wherein the cable 120 includes four optical fiber wires 121 and two plastic fiber wires 122, and seven metal wires 123, wherein each of the four optical fiber wires 121 is used for transmitting an optical signal, each of the plastic fiber wires 122 is used for transmitting a visible light, and each of the seven metal wires 123 is used for transmitting an electrical signal. Please note that there is a dummy wire 160 that is not used in this configuration.

Figure 2C:
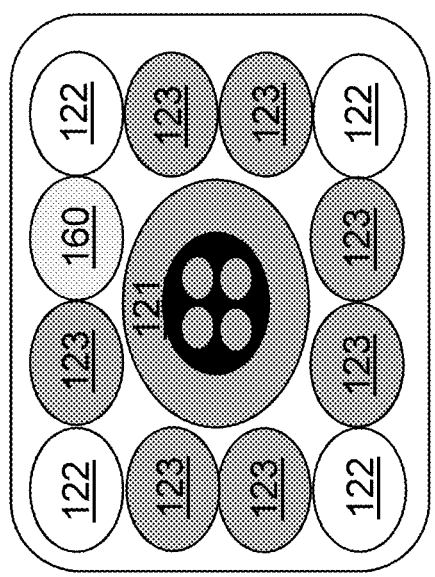

FIG. 2C shows a different configuration, wherein the cable 120 includes four optical fiber wires 121 and four plastic fiber wires 122, and seven metal wires 123, wherein each of the four optical fiber wires 121 is used for transmitting an optical signal, each of the four plastic fiber wires 122 is used for transmitting a visible light, and each of the seven metal wires 123 is used for transmitting an electrical signal. Please note that there is a dummy wire 160 that is not used in this configuration.

Figure 2D:
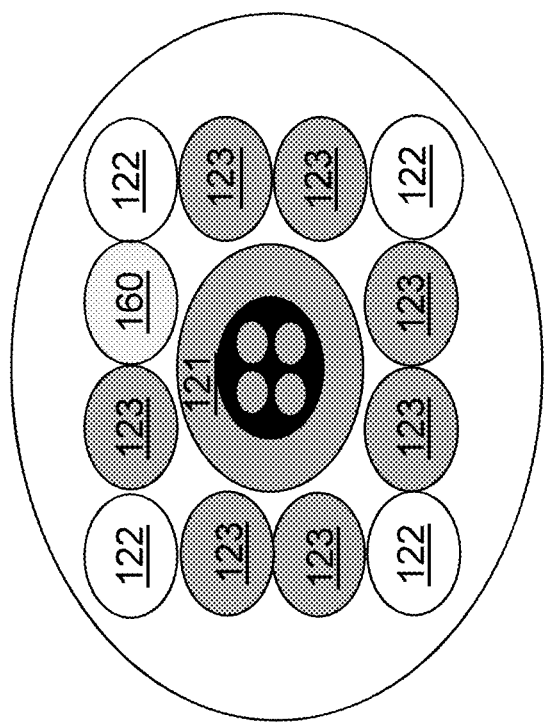

FIG. 2D shows a different configuration, wherein the cable 120 includes four optical fiber wires 121 and four plastic fiber wires 122, and seven metal wires 123, wherein each of the four optical fiber wires 121 is used for transmitting an optical signal, each of the four plastic fiber wires 122 is used for transmitting a visible light, and each of the seven metal wires 123 is used for transmitting an electrical signal. Please note that there is a dummy wire 160 that is not used in this configuration.

Figure 2E:
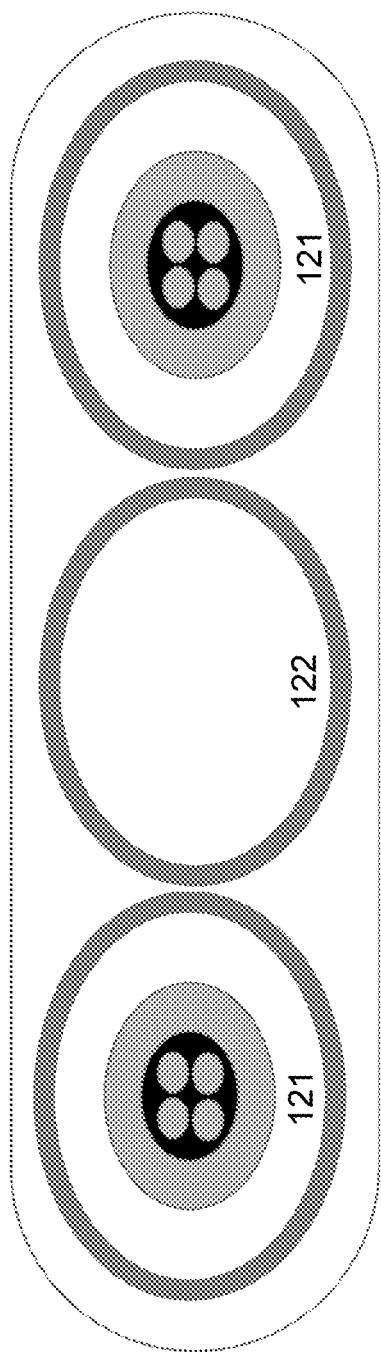

In one embodiment, as shown in FIG. 2E, the cable 120 can comprises duo channel, wherein each channel can have at least one optical fiber wire 121 with an optional plastic fiber wire 122 for transmitting visible light. The cable 120 can also include copper wires for other purposes.

Figure 2G:
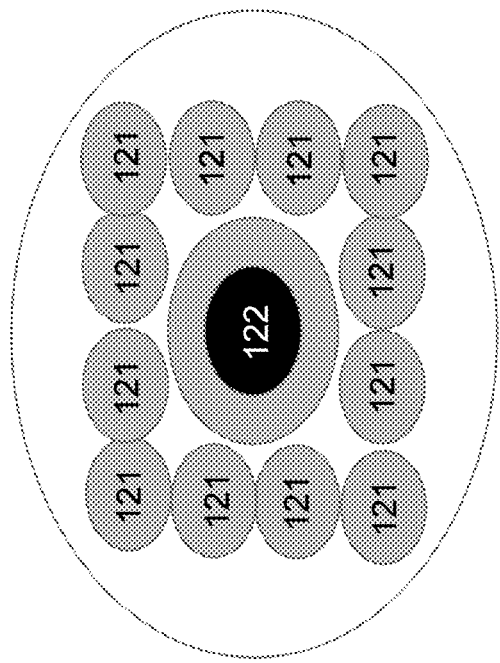
Figure 2F:
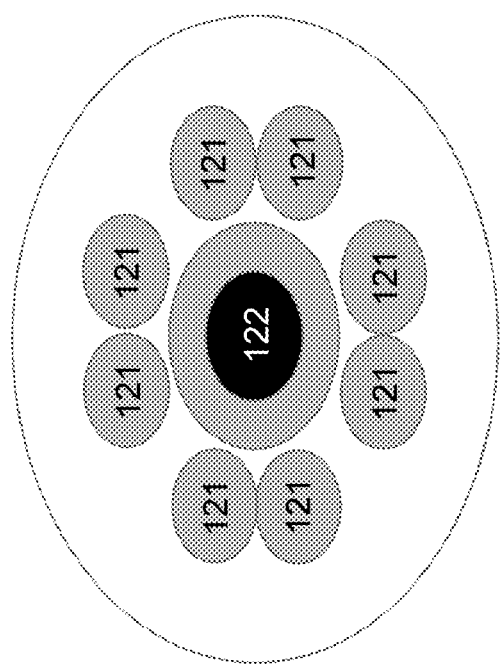

In one embodiment, as shown in FIG. 2F, the cable 120 can comprises eight optical fiber wires 121 with an optional plastic fiber wire 122 for transmitting visible light.

In one embodiment, as shown in FIG. 2G the cable 120 can comprises twelve optical fiber wires 121 with an optional plastic fiber wire 122 for transmitting visible light. The cable 120 can also include copper wires for other purposes.

Figure 3A:
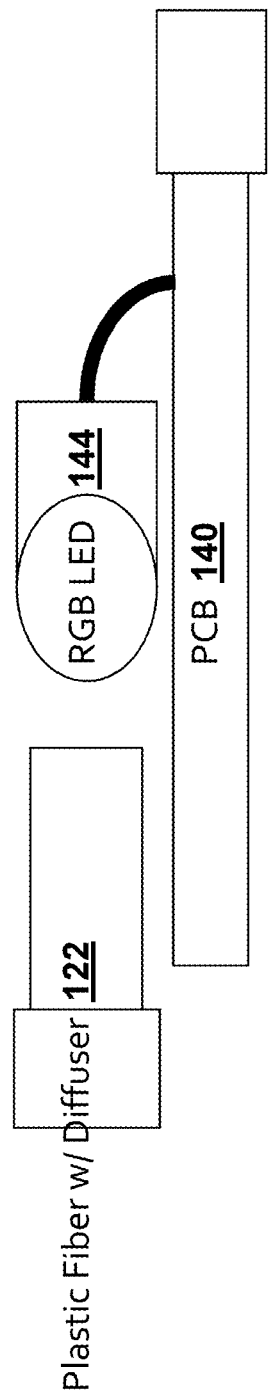
FIG. 3A-3B illustrate a setup for emitting a visible light from one or two RGB LED(s) according to one embodiment of the present invention.

FIG. 3A shows a setup for emitting a visible light from an RGB LED 144, wherein the RGB LED 144 is disposed over the PCB 140 and the visible light emitted by the RGB LED 144 is transmitted to a plastic fiber wire 122. In one embodiment, the plastic fiber wire 122 can be integrated with a diffuser.

Figure 3B:
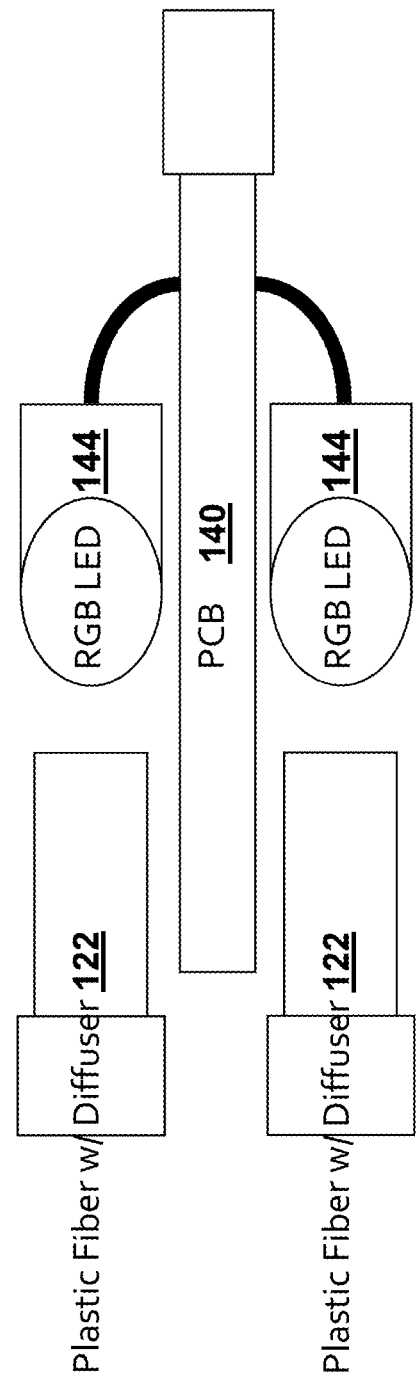

FIG. 3B shows a setup for emitting a visible light from each of two RGB LED 144, wherein one RGB LED 144 is disposed over the PCB 140 and the other RGB LED 144 is disposed under the PCB 140, and a visible light emitted by each RGB LED 144 is transmitted to a corresponding plastic fiber wire 122. In one embodiment, each plastic fiber wire 122 can be integrated with a corresponding diffuser.

FIG. 4A-4D show many different configurations or shapes of the cable. The cable 420 includes at least one optical fiber and at least one plastic fiber and at least one metal wire, wherein each of the at least one optical fiber is used for transmitting optical signals so as to transfer the data from the external device, and the at least one plastic fiber is used for transmitting visible light. The present invention is not limited to the number of the optical fiber wires for transmitting data from the external device or the number of the plastic fiber wires for transmitting the visible light, or the number of the metal wires for transmitting an electrical signal.

Figure 4A:
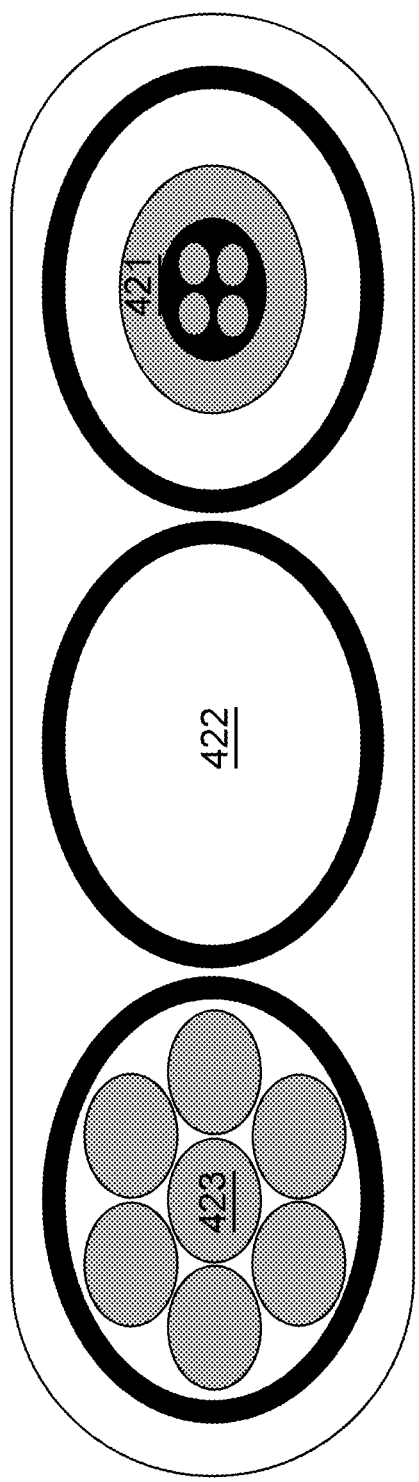
FIG. 4A-4D illustrate many different configurations or shapes of the cable according to one embodiment of the present invention.

As shown in FIG. 4A, the cable 420 includes four optical fiber wires 421 and one plastic fiber wire 422, and seven metal wires 423, wherein each of the four optical fiber wires 421 is used for transmitting an optical signal, the plastic fiber wire 422 is used for transmitting a visible light, and each of the seven metal wires 423 is used for transmitting an electrical signal.

Figure 4B:
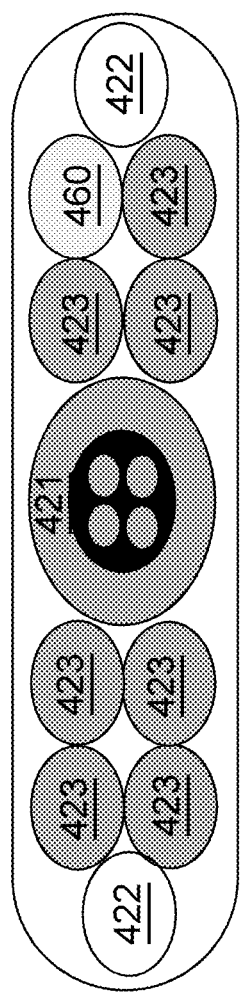

FIG. 4B shows a different configuration, wherein the cable 420 includes four optical fiber wires 421 and two plastic fiber wires 422, and seven metal wires 423, wherein each of the four optical fiber wires 421 is used for transmitting an optical signal, each of the plastic fiber wires 422 is used for transmitting a visible light, and each of the seven metal wires 423 is used for transmitting an electrical signal. Please note that there is a dummy wire 460 that is not used in this configuration.

Figure 4C:
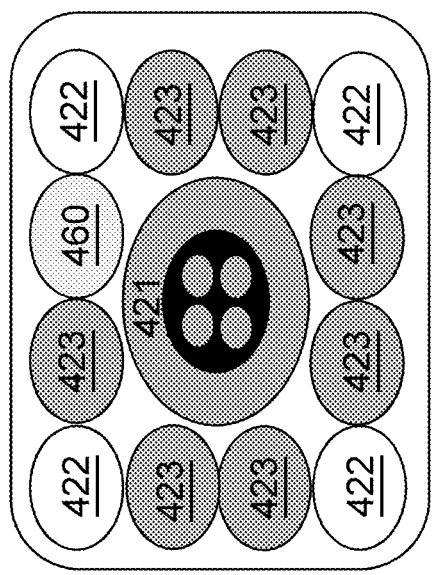

FIG. 4C shows a different configuration, wherein the cable 420 includes four optical fiber wires 421 and four plastic fiber wires 422, and seven metal wires 423, wherein each of the four optical fiber wires 421 is used for transmitting an optical signal, each of the four plastic fiber wires 422 is used for transmitting a visible light, and each of the seven metal wires 423 is used for transmitting an electrical signal. Please note that there is a dummy wire 460 that is not used in this configuration.

Figure 4D:
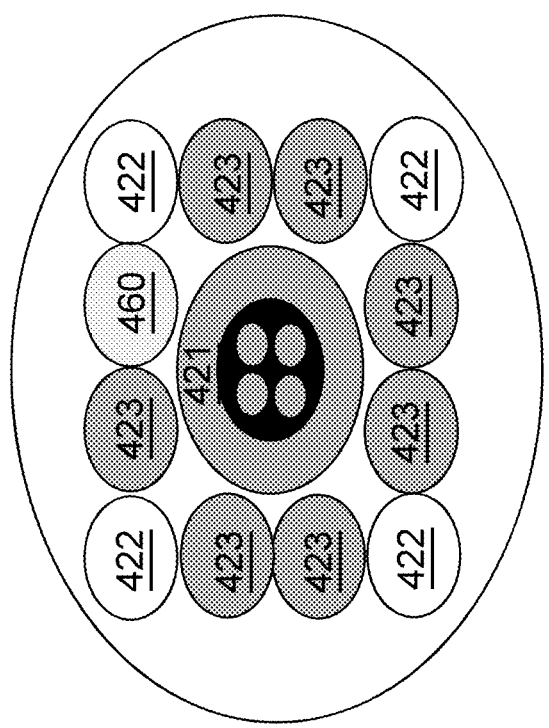

FIG. 4D shows a different configuration, wherein the cable 420 includes four optical fiber wires 421 and four plastic fiber wires 422, and seven metal wires 423, wherein each of the four optical fiber wires 421 is used for transmitting an optical signal, each of the four plastic fiber wires 422 is used for transmitting a visible light, and each of the seven metal wires 423 is used for transmitting an electrical control. Please note that there is a dummy wire 460 that is not used in this configuration.

Figure 5A:
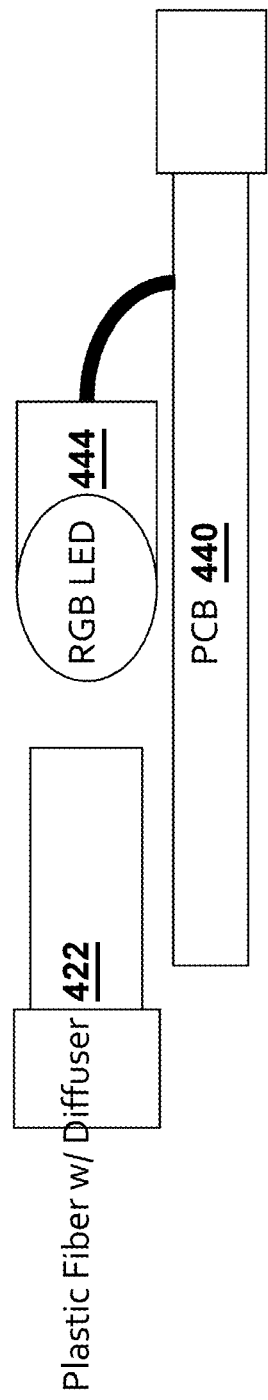
FIG. 5A-5B illustrate a setup for emitting a visible light from one or two RGB LED(s) according to one embodiment of the present invention.

FIG. 5A shows a setup for emitting a visible light from an RGB LED 444, wherein the RGB LED 444 is disposed over the PCB 440 and the visible light emitted by the RGB LED 444 is transmitted to a plastic fiber 422. In one embodiment, the plastic fiber 422 can be integrated with a diffuser.

Figure 5B:
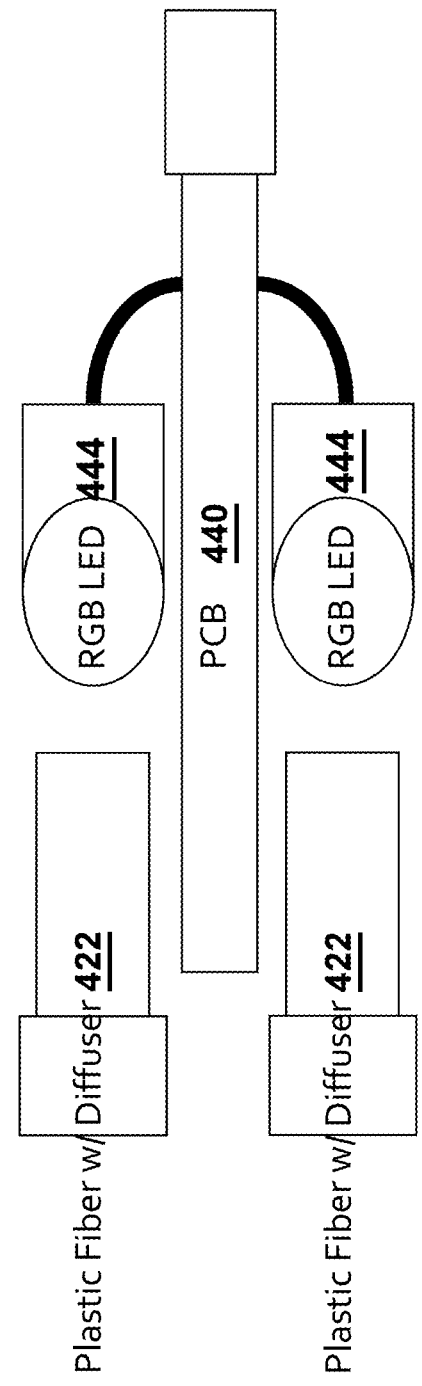

FIG. 5B shows a setup for emitting a visible light from each of two RGB LEDs 444, wherein one RGB LED 444 is disposed over the PCB 440 and the other RGB LED 444 is disposed under the PCB 440, and a visible light emitted by each RGB LED 444 is transmitted to a corresponding plastic fiber 422. In one embodiment, each plastic fiber 422 can be integrated with a corresponding diffuser.

The above disclosure is related to the detailed technical contents and inventive features thereof. People skilled in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A cable assembly, comprising:
a cable, comprising at least one first fiber wire and a first un-pluggable fiber connector connected to the at least one first fiber wire; and
a first connector, comprising:
a first interface, for connecting with an external device;
a second interface, for connecting with said first un-pluggable fiber connector of the cable; and
at least one circuit board, wherein a plurality of devices are disposed on the at least one circuit board to form a circuitry, wherein the circuitry comprises at least one laser diode for emitting at least one optical signal to the at least one first fiber wire via the first connector and said first un-pluggable fiber connector, wherein the cable assembly has no circuit board that extends across an outermost portion of the second interface of the first connector, wherein the cable further comprises at least one second fiber wire, wherein the circuitry further comprises at least one first light-emitting diode (LED) for emitting a first visible light to the at least one second fiber wire.

2. The cable assembly as claimed in claim 1, wherein the cable further comprises a second un-pluggable fiber connector, wherein the first un-pluggable fiber connector and the second un-pluggable fiber connector are connected through the at least one first fiber wire, wherein the cable assembly further comprises a second connector having a third interface for connecting to the second un-pluggable fiber connector of the cable.

3. The cable assembly as claimed in claim 2, wherein the second connector comprises at least one second light-emitting diode (LED) for emitting a second visible light to the at least one second fiber wire.

4. The cable assembly as claimed in claim 2, wherein the second connector conforms to a standard HDMI connector.

5. The cable assembly as claimed in claim 2, wherein when the cable is connected to the first connector and the second connector, said first LED emits a first visible light to the at least one second fiber wire.

6. The cable assembly as claimed in claim 1, wherein at least one circuit board is a single printed circuit board (PCB).

7. The cable assembly as claimed in claim 1, wherein the circuitry comprises at least one control IC for controlling the at least one laser diode and the at least one first LED.

8. The cable assembly as claimed in claim 1, wherein the first LED is an RGB LED.

9. The cable assembly as claimed in claim 8, wherein the circuitry comprises a first switch, wherein the RGB LED emits the first visible light when the first switch is on.

10. The cable assembly as claimed in claim 1, wherein the circuitry comprises a first switch, wherein the first LED emits the first visible light when the first switch is on.

11. The cable assembly as claimed in claim 1, wherein the first LED emits the first visible light when the at least one laser diode is emitting the at least one optical signal.

12. The cable assembly as claimed in claim 1, wherein the first connector conforms to a standard HDMI connector.

13. The cable assembly as claimed in claim 1, wherein the cable further comprises at least one metal wire.

14. A cable assembly, comprising:
a cable, comprising at least one first fiber wire and a first un-pluggable fiber connector connected to the at least one first fiber wire; and
a first connector, comprising:
a first interface, for connecting with an external device;
a second interface, for connecting with said first un-pluggable fiber connector of the cable; and
at least one circuit board, wherein a plurality of devices are disposed on the at least one circuit board to form a circuitry, wherein the circuitry comprises at least one laser diode for emitting at least one optical signal to the at least one first fiber wire via the first connector and said first un-pluggable fiber connector, wherein the cable further comprises at least one second fiber wire, wherein the circuitry further comprises at least one first light-emitting diode (LED) for emitting a first visible light to the at least one second fiber wire.

15. The cable assembly as claimed in claim 14, wherein the cable further comprises a second un-pluggable fiber connector, wherein the first un-pluggable fiber connector and the second un-pluggable fiber connector are connected through the at least one first fiber wire, wherein the cable assembly further comprises a second connector having a third interface for connecting to the second un-pluggable fiber connector of the cable.

16. The cable assembly as claimed in claim 15, wherein the second connector comprises at least one second light-emitting diode (LED) for emitting a second visible light to the at least one second fiber wire.

* * * * *